(12) United States Patent
Nguyen et al.

(10) Patent No.: US 10,878,841 B1
(45) Date of Patent: Dec. 29, 2020

(54) DUAL WRITER FOR ADVANCED MAGNETIC RECORDING

(71) Applicant: Western Digital Technologies, Inc., San Jose, CA (US)

(72) Inventors: Thao A. Nguyen, San Jose, CA (US); Michael Kuok San Ho, Redwood City, CA (US); Zhigang Bai, Fremont, CA (US); Zhanjie Li, Pleasanton, CA (US); Quang Le, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/695,072

(22) Filed: Nov. 25, 2019

(51) Int. Cl.
*G11B 5/187* (2006.01)
*G11B 5/09* (2006.01)
(Continued)

(52) U.S. Cl.
CPC .............. *G11B 5/09* (2013.01); *G11B 5/187* (2013.01); *G11B 5/1871* (2013.01); *G11B 5/23* (2013.01); *G11B 5/315* (2013.01); *G11B 5/3116* (2013.01); *G11B 5/3133* (2013.01); *G11B 5/40* (2013.01); *G11B 5/6005* (2013.01)

(58) Field of Classification Search
None
See application file for complete search history.

(56) References Cited

U.S. PATENT DOCUMENTS

| 3,921,219 A | 11/1975 | Lalesse |
| 5,285,341 A | 2/1994 | Suzuki et al. |

(Continued)

FOREIGN PATENT DOCUMENTS

| JP | S61227209 A | 10/1986 |
| JP | 4043438 B2 | 2/2008 |

(Continued)

OTHER PUBLICATIONS

Akitaya et al. "High Frequency Magnetic Recording Using a Dual Write Head," IEEE Transactions on Magnetics, vol. 52, No. 7, Jul. 2016, DOI: 10.1109/TMAG.2015.2512593 <https://doi.org/10.1109/TMAG.2015.2512593>.

(Continued)

*Primary Examiner* — William J Klimowicz
(74) *Attorney, Agent, or Firm* — Patterson & Sheridan, LLP; Steven H. Versteeg

(57) ABSTRACT

The present disclosure generally relates to a magnetic media drive employing a magnetic recording head. The magnetic recording head comprises a first write head, a second write head, at least one read head, and a thermal fly height control element. The first write head is a wide writing write head comprising a first main pole and a first trailing shield. The second write head a narrow writing write head comprising a second main pole, a trailing gap, a second trailing shield, and one or more side shields. The first main pole has a shorter height and a greater width than the second main pole. The second main pole has a curved or U-shaped surface disposed adjacent to the trailing gap. The thermal fly height control element and the at least one read head are aligned with a center axis of the second main pole of the second write head.

22 Claims, 6 Drawing Sheets

(51) Int. Cl.
*G11B 5/60* (2006.01)
*G11B 5/40* (2006.01)
*G11B 5/31* (2006.01)
*G11B 5/23* (2006.01)

(56) References Cited

U.S. PATENT DOCUMENTS

| | | | |
|---|---|---|---|
| 5,703,740 A | 12/1997 | Cohen et al. | |
| 5,835,313 A | 11/1998 | Sato et al. | |
| 5,883,760 A | 3/1999 | Yamada et al. | |
| 6,801,379 B2* | 10/2004 | Ozue | G11B 5/3103 360/121 |
| 7,116,516 B2 | 10/2006 | Dill et al. | |
| 7,430,098 B1* | 9/2008 | Song | G11B 5/1278 360/294.7 |
| 7,508,619 B2 | 3/2009 | Okamoto et al. | |
| 7,576,951 B2* | 8/2009 | Allen | G11B 5/11 360/125.13 |
| 7,889,456 B2* | 2/2011 | Jiang | G11B 5/112 360/125.08 |
| 7,982,996 B2 | 7/2011 | Smith et al. | |
| 8,116,031 B2 | 2/2012 | Alex et al. | |
| 8,310,782 B2 | 11/2012 | Song et al. | |
| 8,472,135 B1 | 6/2013 | Kusukawa et al. | |
| 8,634,163 B2 | 1/2014 | Tanabe et al. | |
| 8,848,317 B2 | 9/2014 | Shiimoto et al. | |
| 8,947,807 B2 | 2/2015 | Heim et al. | |
| 8,970,966 B2 | 3/2015 | Maetaki | |
| 9,355,655 B1 | 5/2016 | Udo et al. | |
| 9,583,134 B2* | 2/2017 | Yamada | G11B 20/1217 |
| 9,626,990 B2* | 4/2017 | Tang | G11B 5/112 |
| 9,640,205 B1 | 5/2017 | Kaizu et al. | |
| 9,773,517 B2 | 9/2017 | Gao et al. | |
| 9,805,744 B1 | 10/2017 | Xue et al. | |
| 9,842,614 B2* | 12/2017 | Hutchinson | G11B 5/3133 |
| 9,865,301 B1 | 1/2018 | Wiesen et al. | |
| 9,984,707 B2* | 5/2018 | Moore | G11B 5/115 |
| 10,014,012 B1 | 7/2018 | Song et al. | |
| 10,157,632 B1 | 12/2018 | Song et al. | |
| 10,181,334 B1 | 1/2019 | Song et al. | |
| 10,210,888 B1 | 2/2019 | Li et al. | |
| 10,210,891 B1 | 2/2019 | Tian et al. | |
| 10,279,451 B1 | 5/2019 | Liu et al. | |
| 10,311,900 B1 | 6/2019 | Liu et al. | |
| 10,325,618 B1 | 6/2019 | Wu et al. | |
| 10,325,619 B2* | 6/2019 | Wiesen | G11B 5/50 |
| 10,360,935 B1 | 7/2019 | Liu et al. | |
| 10,366,713 B1 | 7/2019 | Tang et al. | |
| 10,366,714 B1 | 7/2019 | Olson et al. | |
| 10,403,309 B2 | 9/2019 | Li et al. | |
| 10,410,658 B1 | 9/2019 | Liu et al. | |
| 10,418,054 B1 | 9/2019 | Liu | |
| 10,482,905 B2* | 11/2019 | Liu | G11B 5/1278 |
| 10,650,847 B2 | 5/2020 | Li et al. | |
| 2004/0100731 A1 | 5/2004 | Sato | |
| 2004/0218306 A1 | 11/2004 | Sato et al. | |
| 2004/0246622 A1 | 12/2004 | Sato | |
| 2006/0126221 A1 | 6/2006 | Kobayashi et al. | |
| 2007/0041119 A1 | 2/2007 | Matsumoto et al. | |
| 2007/0258167 A1* | 11/2007 | Allen | G11B 5/11 360/125.02 |
| 2007/0291409 A1 | 12/2007 | Sasaki et al. | |
| 2008/0186628 A1 | 8/2008 | Hsiao et al. | |
| 2009/0034121 A1 | 2/2009 | Ohta et al. | |
| 2009/0251821 A1 | 10/2009 | Song et al. | |
| 2010/0007992 A1 | 1/2010 | Yamada et al. | |
| 2011/0051288 A1 | 3/2011 | Contreras et al. | |
| 2011/0205861 A1 | 8/2011 | Erden et al. | |
| 2012/0162821 A1 | 6/2012 | Lam et al. | |
| 2013/0170060 A1 | 7/2013 | Johns et al. | |
| 2014/0153134 A1 | 6/2014 | Flan et al. | |
| 2016/0035374 A1* | 2/2016 | Takagishi | G11B 5/11 360/125.03 |
| 2016/0148629 A1* | 5/2016 | Gao | G11B 5/3116 360/64 |
| 2016/0148636 A1 | 5/2016 | Ma et al. | |
| 2017/0076742 A1 | 3/2017 | Tang et al. | |
| 2018/0082714 A1 | 3/2018 | Wiesen et al. | |
| 2019/0244634 A1 | 8/2019 | Goncharov et al. | |
| 2019/0279663 A1 | 9/2019 | Song et al. | |
| 2019/0279664 A1* | 9/2019 | Liu | G11B 5/3123 |
| 2019/0304490 A1 | 10/2019 | Liu et al. | |
| 2019/0333531 A1 | 10/2019 | Liu et al. | |

FOREIGN PATENT DOCUMENTS

| | | | |
|---|---|---|---|
| JP | 2010108533 A | * | 5/2010 |
| JP | 6145124 B2 | * | 6/2017 |

OTHER PUBLICATIONS

U.S. Appl. No. 16/453,991, filed Jun. 26, 2019.
Zhu et al. "Microwave Assisted Magnetic Recording Utilizing Perpendicular Spin Torque Oscillator with Switchable Perpendicular Electrodes," IEEE Transactions on Magnetics, vol. 46, No. 3, Mar. 2000, pp. 751-757.
U.S. Appl. No. 16/015,163, filed Jun. 21, 2018.
International Search Report and Written Opinion issued in corresponding Interntional Search Report dated Aug. 14, 2020 (14 pages).
International Search Report and the Written Opinion for International Patent Application No. PCT/US2020/023679 dated Aug. 14, 2020, 14 pages.
International Search Report and the Written Opinion for International Patent Application No. PCT/US2020/023679 dated Aug. 14, 2020, 12 pages.
International Search Report and the Written Opinion for International Patent Application No. PCT1US20201034721 dated Aug. 16, 2020, 11 pages.

* cited by examiner

US 10,878,841 B1

DUAL WRITER FOR ADVANCED MAGNETIC RECORDING

BACKGROUND OF THE DISCLOSURE

Field of the Disclosure

Embodiments of the present disclosure generally relate to data storage devices, and more specifically, to a magnetic media drive employing a magnetic recording head.

Description of the Related Art

Over the past few years, various magnetic recording methods have been studied to improve the areal density of a magnetic media device, such as a hard disk drive (HDD). Magnetic recording heads in HDDs can have a significant effect on the overall performance and reliability of the recording device. Magnetic recording heads may be designed to achieve specific advantages, such as improved performance, but may consequently have a negative impact on other characteristics, such as decreased reliability.

For example, in conventional perpendicular magnetic recording, there is a tradeoff between linear density (bit per inch (BPI)) and track density (track per inch (TPI)), as the requirements on the write head for high BPI usually lead to a strong write pole that tends to leak magnetic field on the side track, hurting TPI capability. In magnetic recording heads utilizing shingled magnetic recording (SMR) to write tracks on a media, a wide-writing write head is used to sequentially write tracks on a media. The wide-writing write head widely writes a first track, and then widely writes an adjacent second track, where the write of the second track trims the adjacent edge of the first track. As such, the track edges have a large curvature, which limits the signal-to-noise ratio (SNR) that can be achieved. Additionally, the large curvature of the track edges prevents a strong write head from being utilized, limits the bits per track inch (BPI) capability of magnetic recording heads and introduces adjacent track interference (ATI) and a far track interference (FTI) constraints.

Therefore, there is a need in the art for an improved magnetic recording head design.

SUMMARY OF THE DISCLOSURE

The present disclosure generally relates to a magnetic media drive employing a magnetic recording head. The magnetic recording head comprises a first write head, a second write head, at least one read head, and a thermal fly height control element. The first write head is a wide writing write head comprising a first main pole and a first trailing shield. The second write head a narrow writing write head comprising a second main pole, a trailing gap, a second trailing shield, and one or more side shields. The first main pole has a shorter height and a greater width than the second main pole. The second main pole has a curved or U-shaped surface disposed adjacent to the trailing gap. The thermal fly height control element and the at least one read head are aligned with a center axis of the second main pole of the second write head.

In one embodiment, a magnetic recording head comprises a first write head comprising a first main pole and a first trailing shield disposed adjacent to the first main pole. The magnetic recording head further comprises a second write head disposed adjacent to the first write head comprising a second main pole, a second trailing shield disposed adjacent to the second main pole, and one or more side shields surrounding two or more surfaces of the second main pole. The magnetic recording head further comprises one or more read heads, wherein a first read head of the one or more read heads is aligned with the second main pole of the second write head, and a thermal fly height control element aligned with the second main pole of the second write head and the first read head.

In another embodiment, a magnetic recording head comprises a first write head comprising a first main pole, and a first trailing shield disposed adjacent to the first main pole. The magnetic recording head further comprises a second write head disposed adjacent to the first write head comprising a second trailing shield, and a second main pole comprising a first surface, a second surface, and a third surface, wherein the first surface of the second main pole has a curved U-shape, and wherein the first surface of the second main pole is disposed adjacent to the second trailing shield. The second write head further comprises a trailing gap disposed between the first surface of the second main pole and the second trailing shield and one or more side shields surrounding the second and third surfaces of the second main pole.

In another embodiment, a magnetic recording head comprises a first write head comprising a first main pole, a first trailing shield disposed adjacent to the first main pole, and a first seed layer surrounding two or more sides of the first main pole, the first seed layer having a first thickness. The magnetic recording head further comprises a second write head disposed adjacent to the first write head comprising a second main pole, a second trailing shield disposed adjacent to the second main pole, a second seed layer surrounding two or more sides of the second main pole, the second seed layer having a second thickness less than the first thickness of the first seed layer, and one or more side shields surrounding two or more surfaces of the second main pole.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic media drive employing a magnetic recording head. The magnetic recording head comprises a first write head, a second write head, at least one read head, and a thermal fly height control element. The first write head is a wide writing write head comprising a first main pole and a first trailing shield. The second write head a narrow writing write head comprising a second main pole, a trailing gap, a second trailing shield, and one or more side shields. The first main pole has a shorter height and a greater width than the second main pole. The second main pole has a curved or U-shaped surface disposed adjacent to the trailing gap. The thermal fly height control element and the at least one read head are aligned with a center axis of the second main pole of the second write head.

Figure 1:
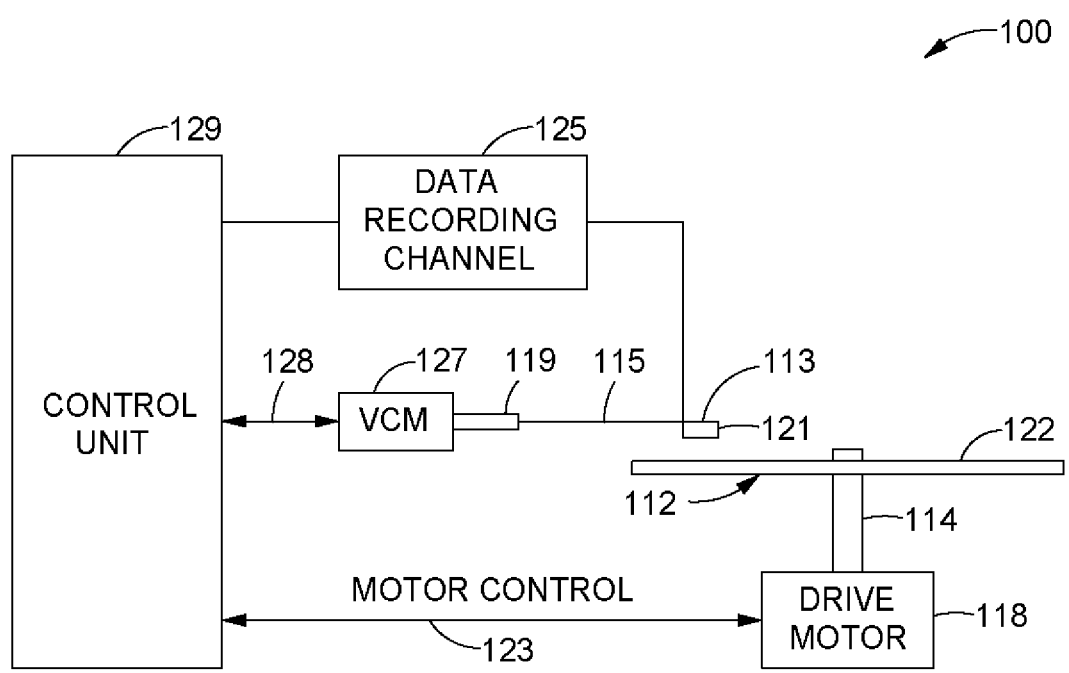
FIG. 1 illustrates a disk drive embodying various embodiments of this disclosure.

FIG. 1 illustrates a data storage device in the form of a disk drive 100 embodying various embodiments of this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit or controller 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. The magnetic field generated from the magnetic head assembly 121 magnetizes the data bits in the media 112.

The various components of the disk drive 100 are controlled in operation by control signals generated by control unit or controller 129, such as access control signals and internal clock signals. Typically, the control unit or controller 129 comprises logic control circuits, storage means, and a microprocessor. The control unit or controller 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2A:
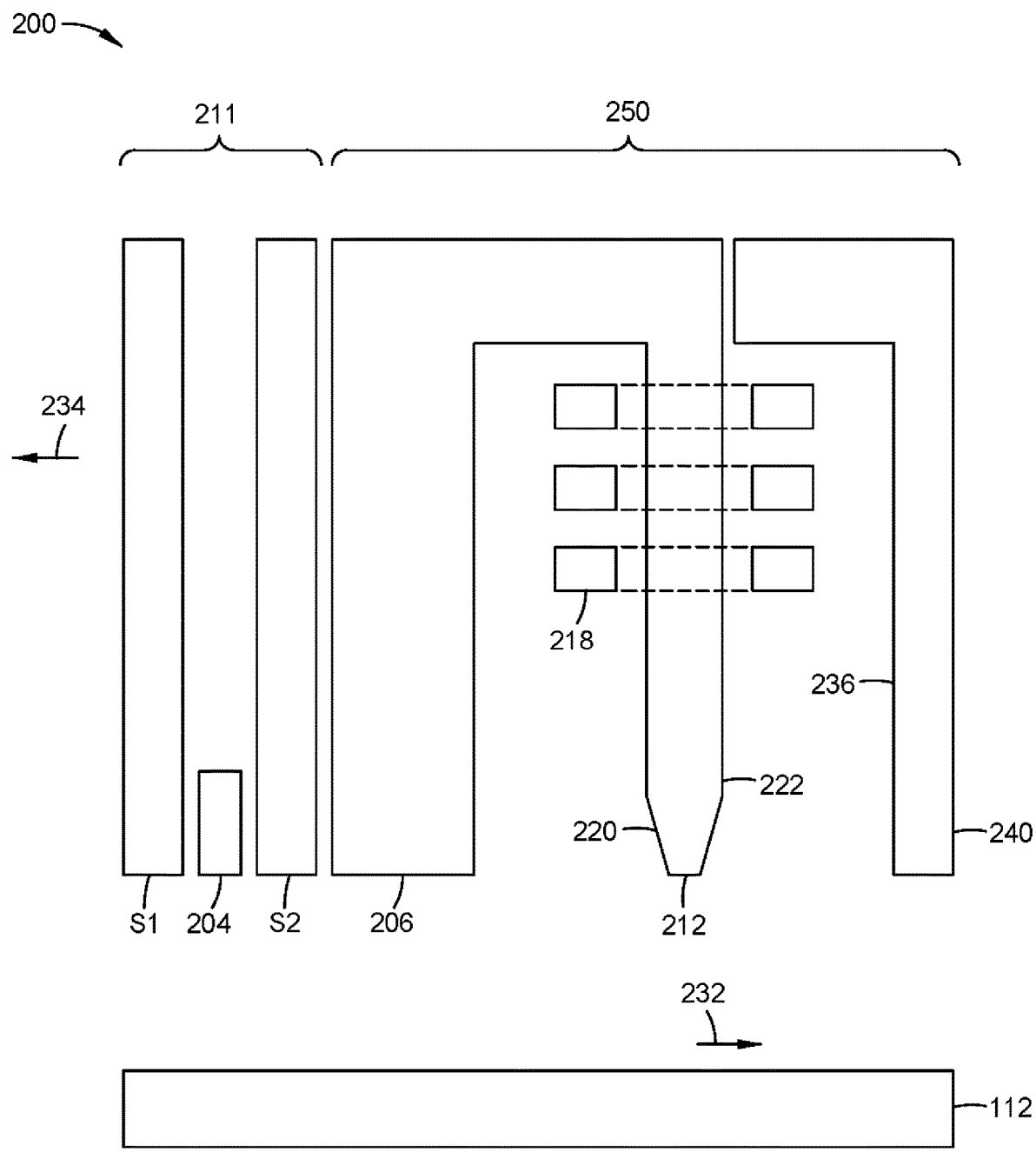
FIGS. 2A-2B illustrate fragmented, cross-sectional side views through the center of a read/write head facing a magnetic media, according to various embodiments.
Figure 2B:
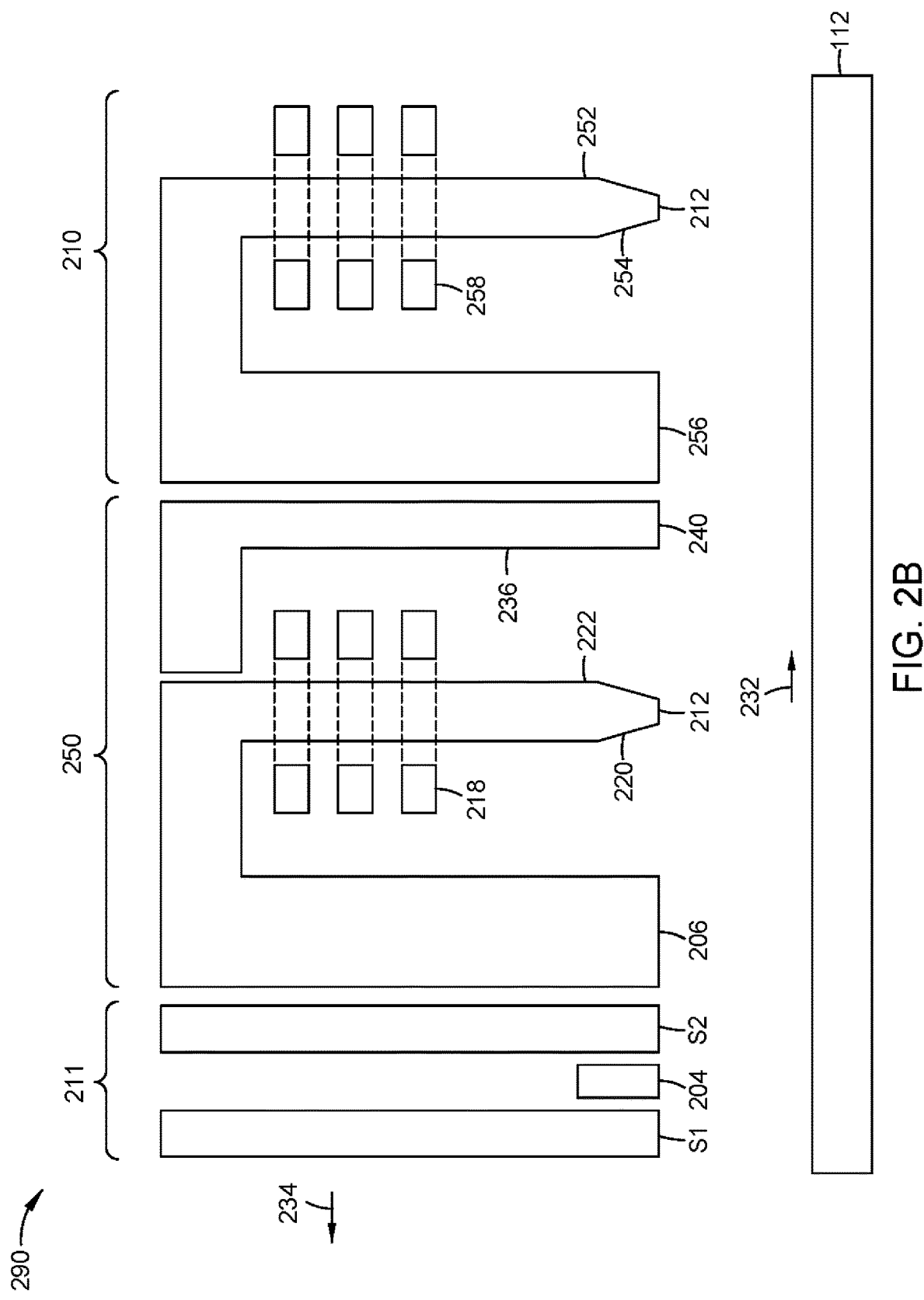

FIGS. 2A-2B illustrate fragmented, cross sectional side views through the center of read/write heads 200, 290, facing the magnetic media 112, respectively, according to various embodiments. The read/write heads 200, 290 may each correspond to the magnetic head assembly 121 described in FIG. 1. The read/write head 200 of FIG. 2A and the read/write head 290 of FIG. 2B are the same; however, the read/write head 200 of FIG. 2A illustrates only one write head 250 while the read/write head 290 of FIG. 2B comprises two write heads 210, 250. The read/write head 200 of FIG. 2A may include another write head 210 disposed behind the write head 250, hidden from view.

The read/write head 200 of FIG. 2A includes a media facing surface (MFS) 212, such as an air bearing surface (ABS), a magnetic write head 250, and a magnetic read head 211, and is mounted such that the MFS 212 is facing the magnetic media 112. The read/write head 290 of FIG. 2B similarly includes a MFS 212, such as an ABS, a first magnetic write head 210, a second magnetic write head 250, and a magnetic read head 211, and is mounted such that the MFS 212 is facing the magnetic media 112. The write head 250 of FIG. 2A is the same as the second write head 250 of FIG. 2B. The read/write heads 200, 290 may each be an energy-assisted magnetic recording (EAMR) head. In FIGS. 2A-2B, the magnetic media 112 moves past the first and/or second write heads 210, 250 in the direction indicated by the arrow 232 and the read/write heads 200, 290 each move in the direction indicated by the arrow 234. It is noted that, in various embodiments, the two write heads may be arranged in a different configuration than this down-track setup.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The first write head 210 of FIG. 2B includes a return pole 256, a first main pole 254, and a first coil 258 that excites the first main pole 254. The second write head 250 of FIGS. 2A-2B includes a return pole 206, a second main pole 220, a trailing shield 240, and a second coil 218 that excites the second main pole 220. A trailing gap (not shown) and a leading gap (not shown) may be in contact with at least the second main pole 220 of the second write head 250 and a leading shield (not shown) may be in contact with the leading gap. A recording magnetic field is generated from the first and/or second main poles 220, 254. The trailing shield 240 of the second write head 250 helps make the magnetic field gradient of the second main pole 220 steep. The second main pole 220 may include a trailing surface 222 which may be parallel to a leading surface 236 of the trailing shield 240. The first main pole 254 may further comprise a trailing surface 252. The trailing shield 240 may be a magnetic material such as NiFe alloy. In one embodiment, the trailing shield 240 has an Ms of about 1.2 T to about 1.6 T.

The first and/or second main poles 220, 254 may each comprise a magnetic material such as an FeCo alloy. The first and/or second main poles 220, 254 may each be a tapered write pole (TWP) with a trailing edge taper (TET) configuration. In one embodiment, the first and/or second main poles 220, 254 each have a saturated magnetization (Ms) of 2.4 T and a thickness between about 300 nanometers (nm). Each main pole 220, 254 may comprise ferromagnetic materials, typically alloys of one or more of Co, Fe and Ni.

Figure 3A:
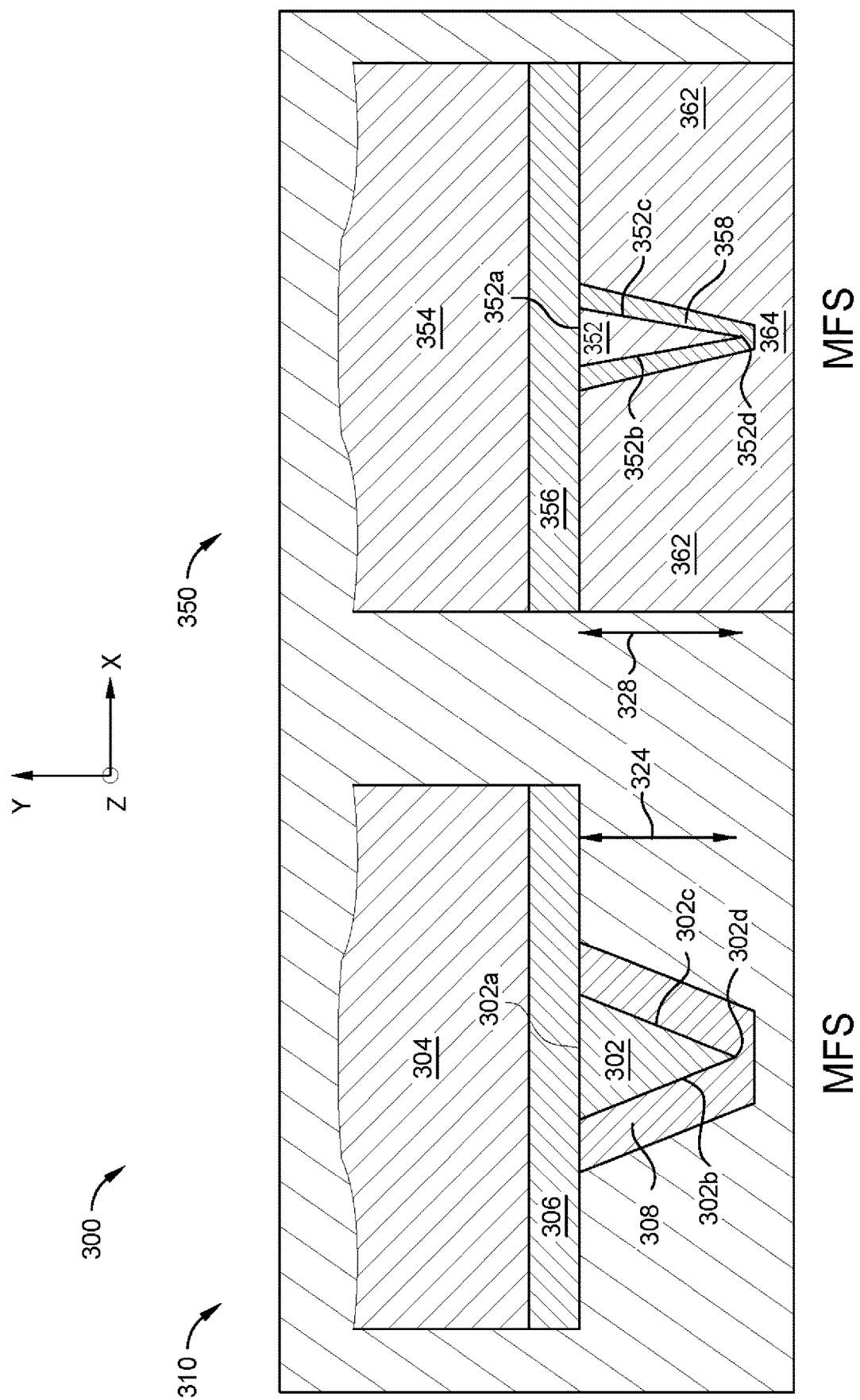
FIG. 3A illustrates a magnetic recording head comprising a first write head and a second write head disposed in a side-by-side formation, according to one embodiment.
Figure 3B:
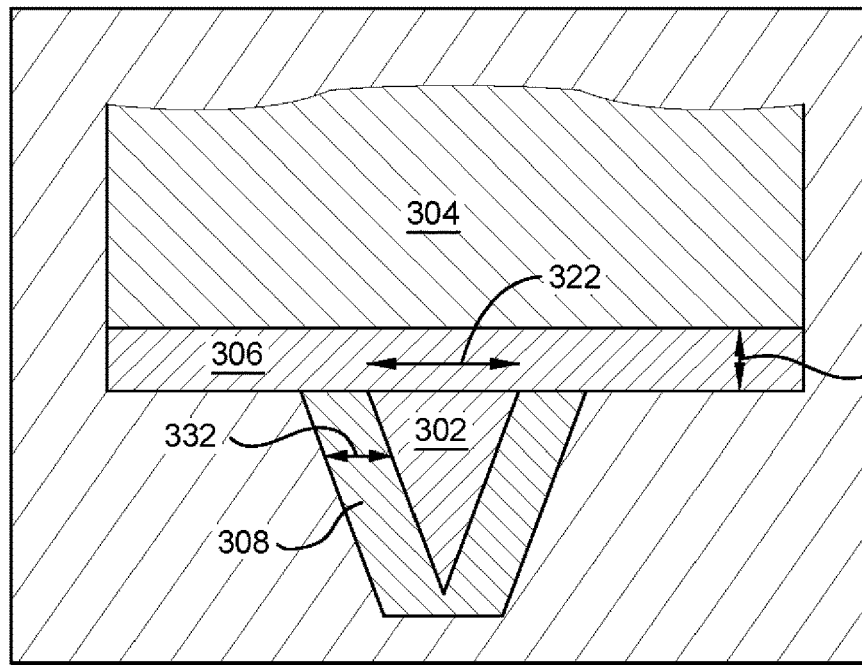
FIG. 3B illustrates the magnetic recording head comprising the first write head and the second write head disposed in a stacked formation, according to another embodiment.
Figure 3B:
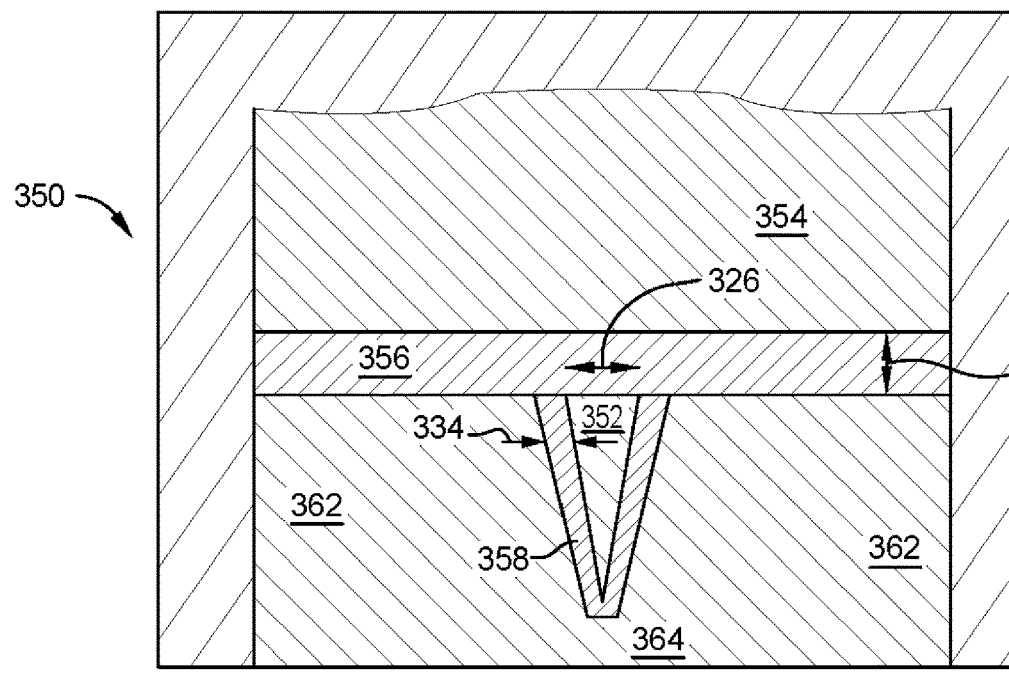
Figure 3B:
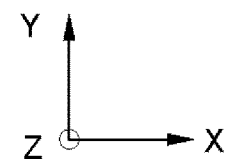

FIGS. 3A-3B illustrate a first write head 310 and a second write head 350 of a magnetic recording head 300, according to various embodiments. FIGS. 3A-3B illustrate different embodiments of the same magnetic recording head 300 comprising the same first and second write heads 310, 350. The magnetic recording head 300 of FIGS. 3A-3B may be used in the disk drive 100 of FIG. 1 and/or the read/write heads 200, 290 of FIGS. 2A-2B. Similarly, the first write head 310 may be the first write head 210 of FIGS. 2A-2B and the second write head 350 may be the second write head 250 of FIGS. 2A-2B.

FIGS. 3A-3B are the same; however, in FIG. 3A, the first write head 310 is adjacent to the second write head 350 in the cross-track direction (i.e., the x-direction) such that the first and second write heads 310, 350 are disposed side-by-side. In FIG. 3B, the first write head 310 is vertically aligned with the second write head 350 such that the first write head 310 is stacked on or over the second write head 350 in a direction perpendicular to the arrangement of FIG. 3A (i.e., aligned in the y-direction). In other words, in FIG. 3B, a center axis of a first main pole 302 of the first write head 310 is linearly aligned with a center axis of a second main pole 352 of the second write head 350. In FIG. 3A, a first trailing shield 304 of the first write head 310 is disposed adjacent to a second trailing shield 354 of the second write head 350 while in FIG. 3B, the first main pole 302 of the first write head 310 is disposed adjacent to the second trailing shield 354 of the second write head 350. Thus, FIG. 3A illustrates the first and second write heads 310, 350 in a side-by-side formation while FIG. 3B illustrates the first and second write heads 310, 350 in a stacked formation.

The first write head 310 comprises a first main pole 302 having a first surface 302a (i.e., a trailing edge), a second surface 302b, a third surface 302c, and a fourth surface 302d (i.e., a leading edge). The fourth surface 302d may be a point, as shown in FIGS. 3A-3B, or could have a length longer than a point in other embodiments. The first write head 310 further comprises a first trailing shield 304, a first trailing gap 306 disposed between the first surface 302a of the first main pole 302 and the first trailing shield 304, and first side gaps 308 surrounding the second, third, and fourth surfaces 302b-302d of the first main pole 302. In one embodiment, the first write head 310 is a wide-writing write head optimized to increase the BPI capability.

The second write head 350 comprises a second main pole 352 having a first surface 352a (i.e., a trailing edge), a second surface 352b, a third surface 352c, and a fourth surface 352d (i.e., a leading edge). The fourth surface 352d may be a point, as shown in FIGS. 3A-3B, or could have a length longer than a point in other embodiments. The second write head 350 further comprises a second trailing shield 354, a second trailing gap 356 disposed between the first surface 352a of the second main pole 352 and the second trailing shield 354, and second side gaps 358 surrounding the second, third, and fourth surfaces 352b-352d of the second main pole 352. Unlike the first write head 310, the second write head 350 further comprises a side shield 362 disposed adjacent to the second and third surfaces 352b, 352c of the second main pole 352 and a leading shield 364 disposed adjacent to the fourth surface 352d of the second main pole 352. In one embodiment, the second write head 350 is a narrow-writing write head optimized to increase the TPI capability.

The first main pole 302 has a first width 322 that is greater than a second width 326 of the second main pole 352, as shown in FIG. 3B. In other words, the first main pole 302 has a greater width than the second main pole 352 in the cross-the-track direction (i.e., the x-direction). The first main pole 302 has a first length or height 324 that is less than a second length or height 328 of the second main pole 352, as shown in FIG. 3A. In other words, the first main pole 302 has a shorter length or height than the second main pole 352 in the along-the-track direction (i.e., the y-direction), or from a trailing edge of the first main pole 302 to a leading edge of the first main pole 302. Such a configuration of the first main pole 302 having a larger width 322 and a shorter or smaller height 324 will produce a stronger field and down-track field gradient to achieve a higher BPI while avoiding an issue called "donut shape footprint" that occurs for a wide write pole having a long or large height due to the demagnetization effect. The demagnetization effect causes a write pole to be less saturated, thus degrading the write head field and BPI. The first write head 310 having a wide first main pole 302 and no side shields allows the first write head 310 to maximize the write field from the first main pole 302. The second write head 350 having a narrow second main pole 352 enables the second write head 350 to perform very fine, focused writes to a media.

To form the first main pole 302 of the first write head 310 having a shorter height than the second main pole 352 of the second write head 350, the openings for the first and second main poles 302, 352 are formed, for example, by reactive ion etched (RIE) to define the main poles 302, 352. A first seed layer, such as a ruthenium layer, is then deposited around and/or on the first and second main poles 302, 352. The second write head 350 is then masked. A second seed layer comprising the same material as the first seed layer is deposited around and/or on the first main pole 302 of the first write head 310 to reduce the height of the first main pole 302. The second write head 350 is then unmasked. Thus, the first write head 310 as a thicker seed layer than the second write head 350, which reduces the height of the first main pole 302.

The first and second seed layers may make up the first and second side gaps 308, 358. As such, the first side gaps 308 of the first write head 310 have a first width 332 greater than a second width 334 of the second side gaps 358 of the second write head 350, resulting in the first and second main poles 302, 352 having different heights. Stated otherwise, the first and second main poles 302, 352 have different heights due to the different widths or thicknesses of the first and second side gaps 308, 358.

Additionally, the first trailing gap 306 of the first write head 310 and the second trailing gap 356 of the second write head 350 may have different widths in the y-direction. In one embodiment, the first trailing gap 306 may have a first width 336 that is greater or wider in the y-direction than a second width 366 of the second trailing gap 356. In another embodiment, the first width 336 of the first trailing gap 306 may be smaller or narrower in the y-direction than the second width 366 of the second trailing gap 356. The first and second trailing gaps 306, 356 having different widths enables independent optimization of the first and second write heads 310, 350 in order to achieve the best field gradient, and thus, improved BPI capabilities.

The magnetic recording head 300 may be used by the controller 129 of the disk drive 100 to execute random writes to a media. When writing to a media, the controller 129 may cause the first write head 310 to widely write every other track (e.g., the even tracks). Following the write of the even tracks by the first write head 310, the controller 129 may then cause the second write head 350 to narrowly write the remaining unwritten tracks (e.g., the odd tracks). In one embodiment, the second write of the second write head 350 trims the adjacent edges of the even tracks written by the first write head 310, and thus, the writing of the media does not experience reading track edge curvature, which increases the areal density capacity (ADC).

Figure 3C:
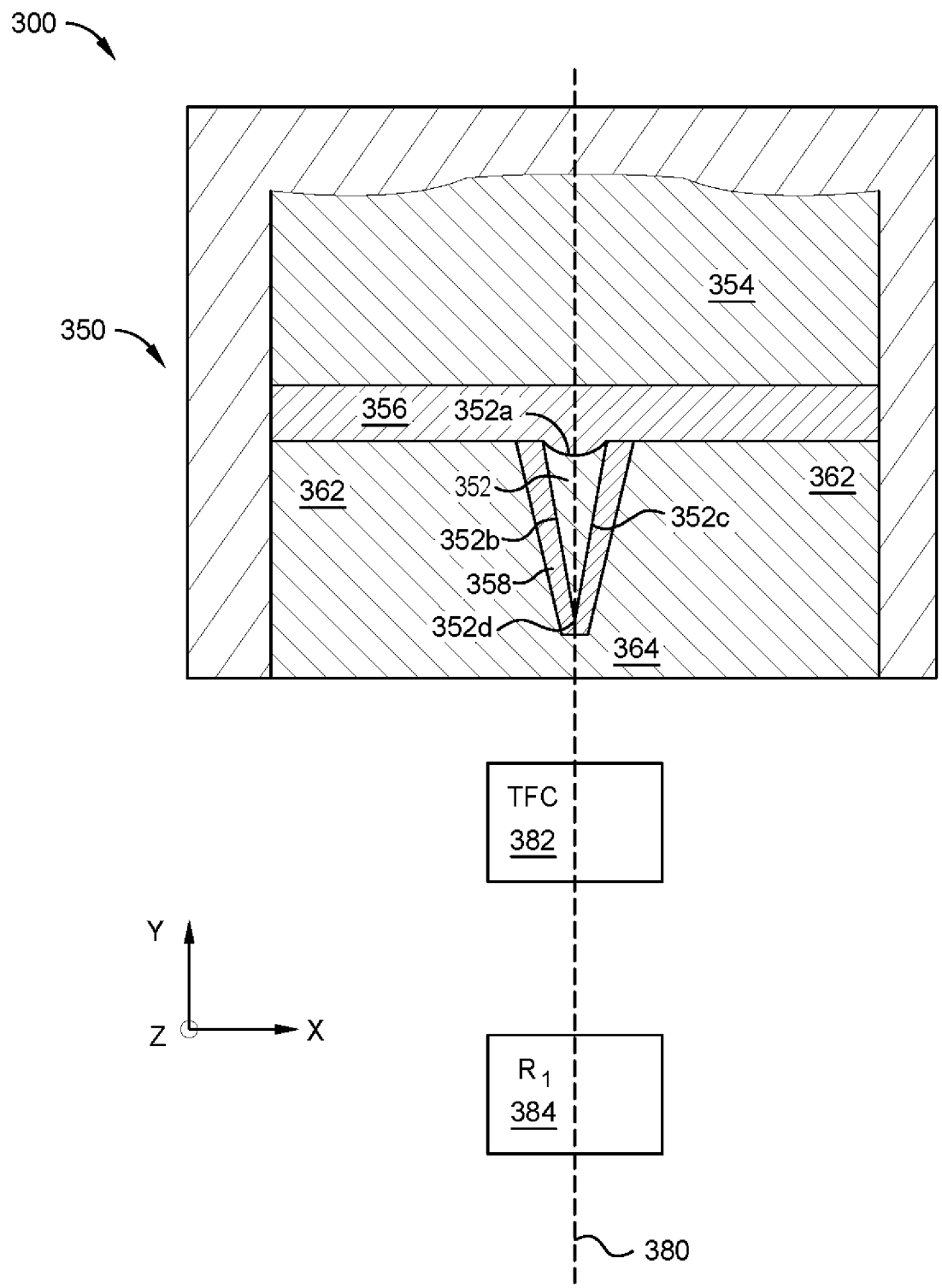
FIG. 3C illustrates the second write head of the magnetic recording head of FIGS. 3A-3B aligned with a thermal fly height control element and at least one read head, according to yet another embodiment.

FIG. 3C illustrates the second write head 350 of the magnetic recording head 300 aligned with a thermal fly height control (TFC) element 382 and at least one read head ($R_1$) 384, according to one embodiment. The TFC element 382 is disposed between the second main pole 352 and the at least one read head 384. As shown in FIG. 3C, a center axis 380 of the second main pole 352 of the second write head 350 is aligned with the TFC element 382 and the at least one read head 384. Since the second write head 350 has a narrower main pole 352, the performance of the second write head 350 is more sensitive to the spacing between the second write head 350 and a media compared to the first write head 310 having a wider main pole 302. A TFC element 382 aligned to the second main pole 352 enables more precise control of the spacing of the second write head 350 to the media, therefore resulting in an overall improved ADC performance.

While the magnetic recording head 300 may comprise a plurality of read heads, at least one read head 384 is aligned with a center axis 380 of the second write head 350. In one embodiment, more than one read head may also be aligned with the center axis 380 of the second write head 350. In another embodiment, additional read heads may be offset from the center axis 380 of the second write head 350 towards the first read head 310 (shown in FIGS. 3A-3B) and/or one or more additional read heads may be aligned with the first write head 310.

Moreover, as shown in FIG. 3C, the first surface 352a of the second main pole 352 of the second write head 350 is curved to have a U-shape or a concave shape. The first surface 352a of the second main pole 352 is curved such that the portion of the first surface 352a disposed on the center axis 380 is closer to the fourth surface 352d than the ends of the first surface 352a coupled to the second and third surfaces 352b, 352c. In other words, the first surface 352a of the second main pole 352 is disposed a first distance below the interface of the second trailing gap 356 and the second side gaps 358 while the first surface 302a of the first main pole 302 is substantially parallel to the interface of the first trailing gap 306 and the first side gaps 308.

The first surface 352a of the second main pole 352 having a curved shape allows for writing straighter transitions with less track edge curvature, thus enabling higher ADC. The first surface 302a of the first main pole 302 of the first write head 310 may optionally be curved to have a U-shape or a concave shape like the second main pole 352. In such an embodiment, the curved first surface 352a of the second main pole 352 would be disposed a first distance below the interface of the second trailing gap 356 and the second side gaps 358 and the curved first surface 302a of the first main pole 302 would be disposed a second distance below the interface of the first trailing gap 306 and the first side gaps 308, the first distance being greater than the second distance. In other words, the first surface 352a of the second main pole 352 would have a steeper or deeper curve than the first surface 302a of the first main pole 302.

By utilizing a magnetic recording head comprising a first writing head configured to optimize the BPI and a second writing head configured to optimize the TPI, tracks of a media may be randomly written without limiting the SNR, without ATI/FTI constraints, and without suffering reading track edge curvature. As such, the dual write head design has an increased ADC. Moreover, utilizing a first write head having a shorter main pole height allows for improved saturation of the first main pole, resulting in better-defined bits with higher SNR and higher ADC, and the second write head having a curved or U-shaped surface adjacent to the trailing gap further enables a straighter transition. Thus, the dual write head design discussed above has an increased ADC, BPI, and TPI as compared to conventional magnetic recording heads comprising a single write head, resulting in both improved writes and reads of data on a media.

In one embodiment, a magnetic recording head comprises a first write head comprising a first main pole and a first trailing shield disposed adjacent to the first main pole. The magnetic recording head further comprises a second write head disposed adjacent to the first write head comprising a second main pole, a second trailing shield disposed adjacent to the second main pole, and one or more side shields surrounding two or more surfaces of the second main pole. The magnetic recording head further comprises one or more read heads, wherein a first read head of the one or more read heads is aligned with the second main pole of the second write head, and a thermal fly height control element aligned with the second main pole of the second write head and the first read head.

The first main pole of the first write head has a shorter height from a trailing edge of the first main pole to a leading edge of the first main pole than the second main pole of the second write head. A write width of the first write head is wider than that of the second write head. The thermal fly height control element is disposed between the second main pole and the first read head. The first write head and the second write head are vertically stacked and disposed in a stacked formation. The first write head is disposed adjacent to the second write head in a cross-the-track direction in a side-by-side formation. A second read head of the one or more read heads is offset from the second main pole in a direction towards the first main pole.

In another embodiment, a magnetic recording head comprises a first write head comprising a first main pole, and a first trailing shield disposed adjacent to the first main pole. The magnetic recording head further comprises a second write head disposed adjacent to the first write head comprising a second trailing shield, and a second main pole comprising a first surface, a second surface, and a third surface, wherein the first surface of the second main pole has a curved U-shape, and wherein the first surface of the second main pole is disposed adjacent to the second trailing shield. The second write head further comprises a trailing gap disposed between the first surface of the second main pole and the second trailing shield and one or more side shields surrounding the second and third surfaces of the second main pole.

The magnetic recording head further comprises one or more read heads, wherein a first read head of the one or more read heads is aligned with the second main pole of the second write head. The first main pole of the first write head has a shorter height from a trailing edge of the first main pole to a leading edge of the first main pole than the second main pole of the second write head, and wherein the first main pole has a greater width in the cross-the-track direction than the second write pole. The magnetic recording head further comprises further comprising a thermal fly height control element, wherein the thermal fly height control element is aligned with the second main pole of the second write head.

The first main pole comprises a first surface, a second surface, and a third surface, wherein the first surface of the first main pole is disposed adjacent to the first trailing shield, and wherein the first surface of the first main pole has a curved U-shape. A write width of the first write head is wider than that of the second write head, and further comprising a controller configured to cause the first write head to first write one or more even tracks or one or more odd tracks of a media, and cause the second write head to subsequently write tracks of the media not written by the first write head. The write of the tracks of the media written by the second write head trims edges of the tracks written by the first write head.

In another embodiment, a magnetic recording head comprises a first write head comprising a first main pole, a first trailing shield disposed adjacent to the first main pole, and a first seed layer surrounding two or more sides of the first main pole, the first seed layer having a first thickness. The magnetic recording head further comprises a second write head disposed adjacent to the first write head comprising a second main pole, a second trailing shield disposed adjacent to the second main pole, a second seed layer surrounding two or more sides of the second main pole, the second seed layer having a second thickness less than the first thickness of the first seed layer, and one or more side shields surrounding two or more surfaces of the second main pole.

The first and second seed layers comprise ruthenium. A first trailing gap of the first write head has a different width than a second trailing gap of the second write head. The first main pole has a shorter height from a trailing edge of the first main pole to a leading edge of the first main pole than the second main pole. A write width of the first write head is wider than that of the second write head. A controller is configured to cause the first write head to first write one or more even tracks or one or more odd tracks of a media, and cause the second write head to subsequently write tracks of the media not written by the first write head. The write of the tracks of the media written by the second write head trims edges of the tracks written by the first write head.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a first write head, comprising:
     a first main pole; and
     a first trailing shield disposed adjacent to the first main pole; and
   a second write head disposed adjacent to the first write head, comprising:
     a second trailing shield;
     a second main pole comprising a first surface, a second surface, and a third surface, wherein the first surface of the second main pole has a curved U-shape, and wherein the first surface of the second main pole is disposed adjacent to the second trailing shield, wherein the first main pole of the first write head has a shorter height from a trailing edge of the first main pole to a leading edge of the first main pole than the second main pole of the second write head;
     a trailing gap disposed between the first surface of the second main pole and the second trailing shield; and
     one or more side shields surrounding the second and third surfaces of the second main pole.

2. The magnetic recording head of claim 1, further comprising one or more read heads, wherein a first read head of the one or more read heads is aligned with the second main pole of the second write head.

3. The magnetic recording head of claim 1, further comprising a thermal fly height control element, wherein the thermal fly height control element is aligned with the second main pole of the second write head.

4. The magnetic recording head of claim 1, wherein the first main pole comprises a first surface, a second surface, and a third surface, wherein the first surface of the first main pole is disposed adjacent to the first trailing shield, and wherein the first surface of the first main pole has a curved U-shape.

5. A data storage device comprising the magnetic recording head of claim 1.

6. The data storage device of claim 5, wherein a write width of the first write head is wider than that of the second write head, and further comprising a controller configured to:
   cause the first write head to first write one or more even tracks or one or more odd tracks of a media, and
   cause the second write head to subsequently write tracks of the media not written by the first write head.

7. The data storage device of claim 6, wherein a width of the tracks of the media written by the second write head trims edges of the tracks written by the first write head.

8. A magnetic recording head, comprising:
   a first write head, comprising:
     a first main pole having a first length in an along-the-track direction and a first width in a cross-the-track direction; and
     a first trailing shield disposed adjacent to the first main pole; and
   a second write head disposed adjacent to the first write head, comprising:
     a second trailing shield;
     a second main pole comprising a first surface, a second surface, and a third surface, wherein the first surface of the second main pole has a curved U-shape, and wherein the second main pole has a second length in the along-the-track direction and a second width in the cross-the-track direction, the second length being greater than the first length and the second width being less than the first width; and
a thermal fly height control element aligned with a center axis of the second main pole of the second write head.

9. The magnetic recording head of claim 8, further comprising one or more read heads, wherein a first read head of the one or more read heads is aligned with the center axis of the second main pole of the second write head.

10. The magnetic recording head of claim 8, wherein the first trailing shield of the first write head is aligned with the second trailing shield of the second write head.

11. The magnetic recording head of claim 8, wherein the first write head is disposed adjacent to the second write head in a cross-track direction.

12. The magnetic recording head of claim 8, wherein the first write head further comprises first side gaps surrounding one or more surfaces of the first main pole, the first side gaps having a first width in a cross-the-track direction, and
wherein the second write head further comprises second side gaps surrounding the second and third surfaces of the second main pole, the second side gaps having a second width in the cross-the-track direction greater than the first width of the first side gaps.

13. The magnetic recording head of claim 8, wherein the first write head lacks one or more side shields.

14. The magnetic recording head of claim 13, wherein the second write head further comprises one or more side shields surrounding the second and third surfaces of the second main pole.

15. A data storage device comprising the magnetic recording head of claim 8.

16. The data storage device of claim 15, wherein a write width of the first write head is wider than that of the second write head, and further comprising a controller configured to:
cause the first write head to first write one or more even tracks or one or more odd tracks of a media, and
cause the second write head to subsequently write tracks of the media not written by the first write head, wherein the write of the tracks of the media written by the second write head trims edges of the tracks written by the first write head.

17. A magnetic recording head, comprising:
a first write head, comprising:
a first main pole comprising a first surface, a second surface, and a third surface, wherein the first surface of the first main pole has a curved U-shape, and wherein the first main pole has a first length in an along-the-track direction;
first side gaps surrounding the second and third surfaces of the first main pole, the first side gaps having a first width in a cross-the-track direction; and
a first trailing shield disposed adjacent to the first surface of the first main pole; and
a second write head disposed adjacent to the first write head, comprising:
a second trailing shield aligned in the cross-the-track direction with the first trailing shield of the first write head;
a second main pole comprising a first surface, a second surface, and a third surface, wherein the first surface of the second main pole has a curved U-shape, wherein the first surface of the second main pole is disposed adjacent to the second trailing shield, and wherein the second main pole has a second length in the along-the-track direction greater than the first length; and
second side gaps surrounding the second and third surfaces of the second main pole, the second side gaps having a second width in the cross-the-track direction greater than the first width of the first side gaps.

18. The magnetic recording head of claim 17, further comprising a thermal fly height control element, wherein the thermal fly height control element is aligned with a center axis the second main pole of the second write head.

19. The magnetic recording head of claim 17, further comprising at least one read head, the at least one read head being aligned with a center axis the second main pole of the second write head.

20. The magnetic recording head of claim 17, wherein the second write head further comprises one or more side shields surrounding the second side gaps, and wherein the first write head lacks one or more side shields.

21. A data storage device comprising the magnetic recording head of claim 17.

22. The data storage device of claim 21, wherein a write width of the first write head is wider than that of the second write head, and further comprising a controller configured to:
cause the first write head to first write one or more even tracks or one or more odd tracks of a media, and
cause the second write head to subsequently write tracks of the media not written by the first write head, wherein the write of the tracks of the media written by the second write head trims edges of the tracks written by the first write head.

* * * * *